United States Patent [19]

Varrasso

[11] Patent Number: 4,787,926
[45] Date of Patent: Nov. 29, 1988

[54] DIGITALLY CONTROLLED TUBE BUILD-UP COMPENSATOR FOR A GLASS FIBER FORMING MACHINE METHOD

[75] Inventor: Eugene C. Varrasso, Heath, Ohio

[73] Assignee: Owens-Corning Fiberglas Corporation, Toledo, Ohio

[21] Appl. No.: 95,971

[22] Filed: Sep. 14, 1987

[51] Int. Cl.$^4$ ............................................. C03B 37/02
[52] U.S. Cl. .......................................... 65/2; 65/10.1; 65/29; 65/162
[58] Field of Search ............... 65/1, 2, 29, 160, 162, 65/10.1

[56] References Cited

U.S. PATENT DOCUMENTS

| | | | |
|---|---|---|---|
| 3,126,268 | 3/1964 | Roberson | 65/10.2 |
| 3,269,816 | 8/1966 | Helbing | 65/2 |
| 3,471,278 | 10/1969 | Griem, Jr. | 65/2 |
| 3,582,298 | 6/1971 | Trethewey | 65/10.1 |
| 4,145,201 | 3/1979 | Phillips | 65/2 |
| 4,146,376 | 3/1979 | Beckman et al. | 65/29 X |
| 4,657,572 | 4/1987 | Desai et al. | 65/1 |

Primary Examiner—Robert L. Lindsay
Attorney, Agent, or Firm—Patrick P. Pacella; Ronald E. Champion; Richard S. MacMillan

[57] ABSTRACT

A digitally controlled apparatus for varying the temperature of a glass fiber forming bushing over a period of time is disclosed. A clock generates timing pulses at a predetermined frequency to a BCD counter. The output signals from the BCD counter are fed to a comparator means. BCD output signals generated by a plurality of manually operable switch assemblies are also fed to the comparator means. The switch assemblies are set by an operator to generate a predetermined number related to the amount of time required to wind a strand of glass fibers upon a tube. The comparator means generates an output pulse when the count of the BCD counter equals the number set by the switch assemblies, then resets the BCD counter to zero. The output pulses from the comparator means are fed to a binary counter. The output lines from the binary counter are connected to a digital to analog converter. The converter generates an analog output signal which is proportional to the magnitude of the number from the binary counter. The maximum value of the output signal is determined by a referance voltage. The output signal from the converter is combined with an actual bushing temperature signal from a thermocouple attached to the bushing into a composite feedback signal. The composite signal is fed to a temperature controller for the bushing. The converter output signal modifies the thermocouple output signal so as to cause the temperature controller linearly increase the temperature of the bushing as the tube is being wound with a strand of glass fibers. As a result, the diameter of the strand is maintained relatively constant.

12 Claims, 2 Drawing Sheets

DIGITALLY CONTROLLED TUBE BUILD-UP COMPENSATOR FOR A GLASS FIBER FORMING MACHINE METHOD

TECHNICAL FIELD

The present invention relates in general to production control systems and in particular to a method and apparatus for digitally controlling a tube build-up compensator for a glass fiber forming machine.

BACKGROUND OF THE INVENTION

Glass fibers are commonly utilized in many industrial and consumer products throughout the world. Consequently, it is important that the production of such glass fibers be accomplished in an efficient fashion. In one known machine for producing these glass fibers, a precious metal bushing is provided having an internal cavity and a bottom portion. The internal cavity forms a reservoir adapted to receive molten glass therein. The bottom portion has a plurality of relatively small apertures formed therethrough which extend into the internal cavity. The molten glass in the internal cavity is drawn through the apertures to form the individual glass fibers. The bushing is heated to a relatively high temperature to facilitate the flow of the molten glass through the apertures.

As the individual glass fibers are produced, they are usually combined together into multiple fiber strands. The strands are then wound upon respective cylindrical tubes, each of which is rotated by a mechanical winder. A winder is usually provided for each bushing. The rotation of each tube by its corresponding winder draws the molten glass through the apertures under tension and, therefore, attenuates the glass fibers and strands as they are formed. Preferably, a predetermined uniform length of each strand is wound upon each tube before the wound tube is removed from the winder and a bare tube is inserted. In order to achieve this predetermined uniform strand length on each tube, it is important that the glass fibers be produced having relatively uniform diameters throughout their length.

The diameter of each of the glass fibers (and, consequently, of each of the strands) produced by the machine described above is dependent upon several factors. One such factor is the amount of the mechanical attenuation induced in the glass fibers and strands by the winders. Such mechanical attenuation is caused by the pulling of the glass fibers and strands by the rotating tubes. In order to maintain the diameters of the strands constant, the amount of molten glass which passes through the bushing apertures per unit time should be constant. Assuming that the temperature of the bushing is fixed at a certain level, the viscosity of the molten glass will remain constant. Therefore, the diameters of the glass fibers and strands will remain constant so long as the linear speed at which the molten glass is drawn through the bushing apertures does not change.

However, as each glass strand is wound about its tube, the effective outer diameter of the tube is increased by the continuous overlapping of the strand upon itself. If the winder is driven at a constant rotational speed, therefore, the tangential speed at which the strand is wound about the tube (and, therefore, the linear speed at which the glass fibers are drawn through the bushing apertures) will increase with the effective outer diameter of the tube. To compensate for this phenomenon, variable rotational speed winders have been provided, which reduce the rotational speed of the tube as it is wound with the glass strand. As a result, the linear speed at which the glass fibers are drawn through the bushing apertures is maintained relatively constant.

A temperature controller is commonly utilized to regulate the temperature of the bushing. In one such temperature controller which is known in the art, a power supply causes an electric current to pass through the bushing. Since the bushing resists the flow of such electric current, the amount of heat generated in the bushing is proportional to the amount of the electric current passed therethrough. The amount of the current is controlled in response to a predetermined desired temperature signal. One or more thermocouples may be attached to various locations on the bushing. The thermocouples generate electrical signals which are representative of the temperature of the bushing at the attached locations. Those electrical signals are fed back to a temperature comparator, where they are compared with the desired temperature signal. If the actual temperature of the bushing is less than the desired temperature, the temperature comparator causes the power supply to increase the amount of electric current passing through the bushing, and vice versa. As a result, a predetermined desired temperature of the bushing is achieved. This temperature feedback provides an additional measure of accuracy for the temperature controller. By providing a plurality of such thermocouples, the temperature of each of a plurality of individual sections of the bushing can be controlled independently of one another.

Unfortunately, the variable rotational speed winders described above are not always available for use with the glass fiber forming machines. Thus, an alternative approach is required for constant speed winders in order to prevent changes in the mechanical attenuation of the glass fibers from occurring during the winding process. One alternative approach which is known in the art involves increasing the temperature of the bushing as the glass strand is wound upon the tube. As the temperature of the bushing is increased, the viscosity of the molten glass retained therein is decreased, and the molten glass flows more freely through the bushing apertures. Therefore, even though the linear speed at which the glass fibers are drawn through the bushing apertures increases as a result of the increased effective outer diameter of the tube being wound, the amount of the molten glass which passes through the bushing apertures per unit time remains relatively constant. Thus, the amount of the mechanical attenuation (and, therefore, the diameter) of the glass fibers and strands remains approximately constant.

Generally, if the temperature of the bushing is increased at a constant linear rate over the period of time required to completely wind the tube, the resulting diameters of the glass fibers and strands will remain relatively constant. To accomplish this, it is known to modify the temperature feedback signal from the thermocouples with an electrical signal from a common resistor-capacitor temperature compensating circuit. The capacitor is charged at a rate determined by the values of the resistor and the capacitor. As a result, the voltage differential across the capacitor increases over time at a predetermined rate. The values of the resistor and the capacitor are selected such that the range of the voltage differential across the capacitor is approximately linear for the required period of time. The temperature compensating circuit signal is combined with the actual temperature feedback signal to generate a composite feedback signal. The composite feedback signal indicates to the temperature comparator that the temperature of the bushing is decreasing below the actual temperature thereof as the tube is wound. Because of this, the temperature comparator causes the power supply to increase the amount of current being passed through the bushing, even though the actual temperature of the bushing is not less than the desired temperature. This increase in current is controlled in accordance with the value of the voltage differential across the capacitor. When the tube is completely wound, the capacitor is discharged, and the process described above is repeated.

The resistor-capacitor temperature compensating circuit described above is undesirable for several reasons. First, the charging of the capacitor often occurs at a non-linear rate because of variations in the source of voltage utilized to operate the system and because the timing circuit is sensitive to ambient temperature and humidity conditions. Second, the initial set up of such a circuit, including the precise setting of the starting and ending current values, is difficult to achieve and, in any event, is time consuming. Accordingly, it would be desirable to provide an improved method and apparatus for varying the temperature of the bushing in a glass fiber forming machine having a constant speed winder.

SUMMARY OF THE INVENTION

The present invention relates to an improved method and apparatus for varying the temperature of a glass fiber forming bushing over a period of time which utilizes digital control techniques. A clock generates timing pulses at a predetermined frequency to a binary coded decimal (BCD) up counter. The BCD counter generates binary coded decimal output signals which are representative of the number of pulses received from the clock. The output signals from the BCD counter are fed to a comparator means. Output signals generated by a plurality of manually operable switch assemblies are also fed to the comparator means. The switch assemblies are set by an operator to generate a predetermined number related to the amount of time required to wind a strand of glass fibers upon a tube. The comparator means generates an output pulse when the count of the BCD counter equals the number set by the switch assemblies. The output pulse from the comparator means resets the BCD counter to zero, which then begins counting up again. The output pulses from the comparator means are also fed to a binary counter. The binary counter generates a binary number signal on a plurality of output lines which is representative of the number of pulses which it receives from the comparator means.

The output lines from the binary counter are connected to a digital to analog converter. The converter generates an output signal which is proportional to the magnitude of the binary number which it receives. The maximum value of the output signal is determined by a reference voltage. The output signal from the converter is combined with a signal from a thermocouple attached to the bushing into a composite feedback signal. The thermocouple signal represents the actual temperature of the bushing. The composite signal is fed to a temperature controller for the bushing. The output signal from the converter modifies the output signal from the thermocouple so as to cause the temperature controller linearly increase the temperature of the bushing as the tube is being wound with a strand of glass fibers. As a result, the diameter of the strand is maintained relatively constant. When the count of binary counter reaches a predetermined number, or if the winding process is interrupted, the binary counter is reset to zero.

It is an object of the present invention to provide an improved method and apparatus for varying the temperature of a glass fiber forming bushing over a period of time which utilizes digital control techniques.

It is another object of the present invention to provide such an improved method and apparatus which is more accurate and stable than known devices in the art.

It is a further object of the present invention to provide such an improved method and apparatus which can be set up and changed in a relatively quick and simple manner.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
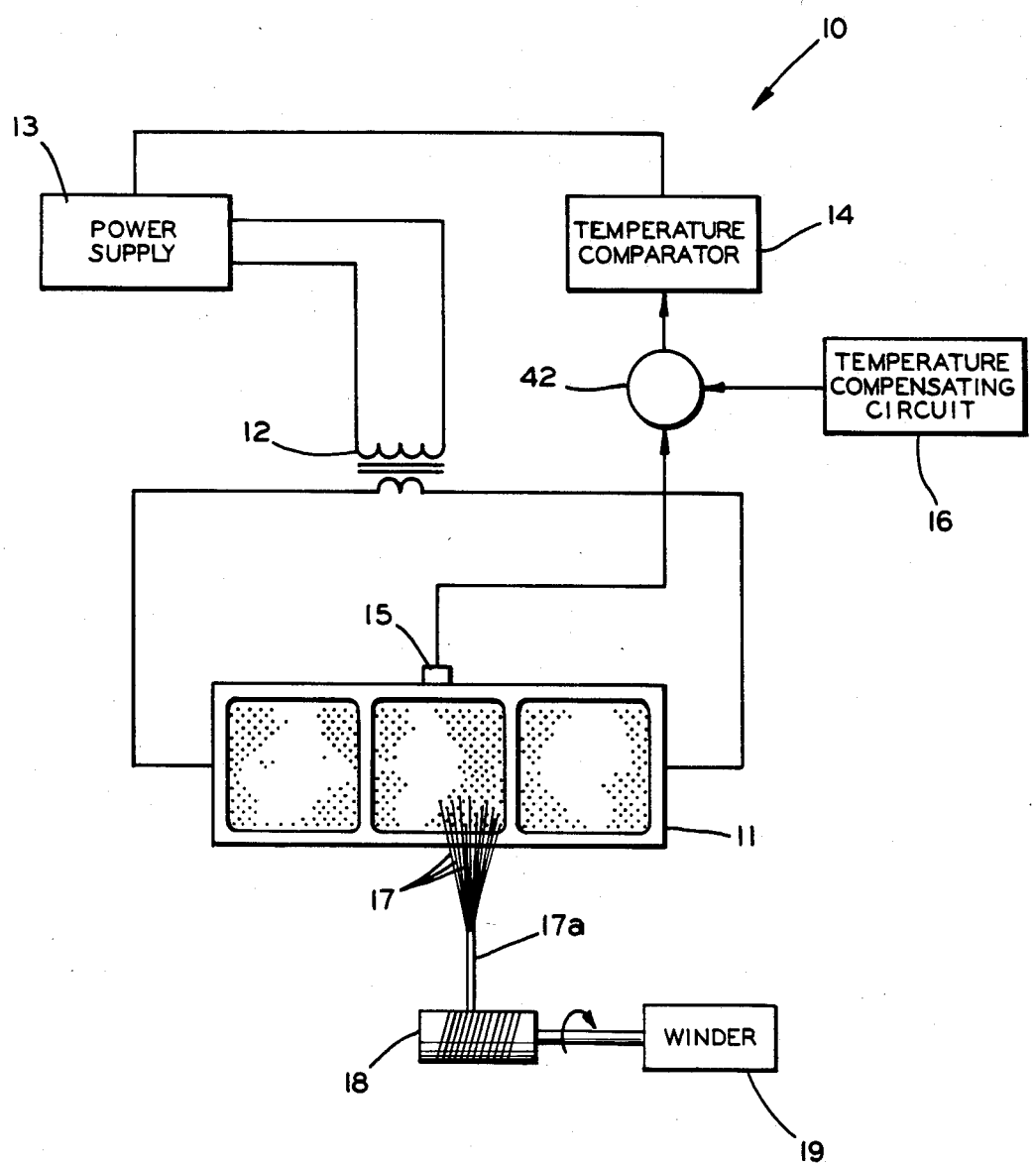
FIG. 1 is a block diagram schematically illustrating a portion of a glass fiber forming machine in accordance with the present invention.

Referring now to the drawings, there is schematically illustrated in FIG. 1 a portion of a glass fiber forming machine, indicated generally at 10, in accordance with the present invention. The glass fiber forming machine 10 includes a mineral or glass fiber forming bushing assembly 11. The bushing 11 may be segmented into three individual sections, as illustrated. However, the actual number of sections may be greater or less than the three sections described herein. Electrical energy is supplied across the entire bushing 11 through a pair of lines, which are respectively connected between the opposite ends of the bushing 11 and the secondary of a power transformer 12. The primary of the power transformer 12 is connected to a power supply 13 which, in turn, is connected to a source of electrical energy (not shown).

The power supply 13 receives a control signal from a temperature comparator 14. The power supply 13 adjusts the magnitude of its output to the primary of the power transformer 12 in accordance with the control signal. The control signal is generated by the temperature comparator 14 in response to a composite temperature feedback signal from a first thermocouple 15 attached to the bushing 11 and a temperature compensating circuit 16. The temperature compensating circuit 16 is described in detail below. The temperature comparator 14 compares the composite signal with a predetermined desired temperature signal and generates the control signal to the power supply 13 in accordance therewith.

As shown in FIG. 1, a plurality of glass fibers 17 are created by the passage of molten glass through the apertures of the bushing 11. The glass fibers 17 are combined into strands 17a (only one is illustrated), each of which is wound upon a tube 18. Each tube 18 is selectively rotated at a constant speed by a winder 19. Preferably, a predetermined length of the strand 17a is wound upon each tube 18 before it is removed and replaced with a bare tube.

Figure 2:
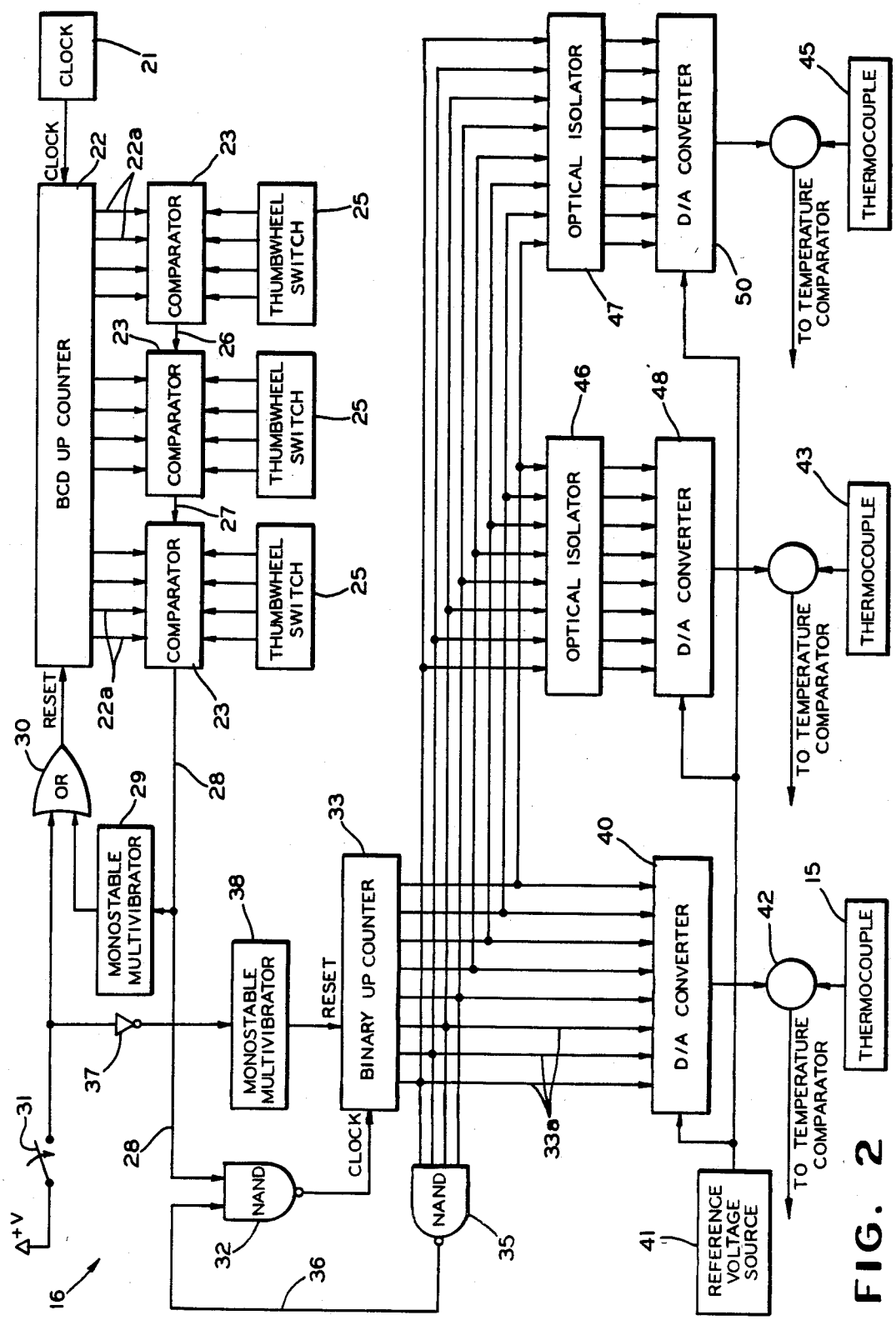
FIG. 2 is an electrical schematic diagram of a digital temperature compensating circuit for a multiple section bushing of the glass fiber forming machine illustrated in FIG. 1.

Referring now to FIG. 2, there is illustrated an electrical schematic diagram of a digital temperature compensating circuit 16 for controlling the temperature of the bushing 11. The system includes a clock 21, which is adapted to generate a square wave pulse train output signal at a predetermined frequency in a known manner. The output signal from the clock 21 oscillates between a positive voltage level (or high signal) and an approximately zero voltage level (or low signal), as is well known in the art. It has been found to be convenient to generate such output pulses at a frequency of sixty cycles per second.

The output pulses from the clock 21 are fed to a clock input of a binary coded decimal (BCD) up counter 22. The BCD counter 22 is conventional in the art and is responsive to the positive moving edges of the incoming pulses from the clock 21 for generating high output signals on a plurality of output lines 22a. The output signals generated by the BCD counter 22 represent a binary coded decimal number which is equal to the number of pulses received at the clock input thereof. In the illustrated embodiment, the BCD counter 22 generates three decimal digit output signals, each of which is defined by a four bit binary number. However, the number of the decimal digit output signals may be varied.

The decimal digit output signals from the BCD counter 22 are fed to respective comparators 23. Each of the comparators 23 also receives a four bit decimal digit output signal from a respective one of a plurality of switch assemblies 25. The switch assemblies 25 are all identical and include means for generating a four bit binary number representing a desired decimal digit. The number generated by each of the switch assemblies 25 can be determined by a rotatable thumbwheel (not shown) or other means, which is set by an operator of the system. Since each of the switch assemblies 25 is independent of the others, it can be seen that an operator may cause any combination of the three decimal digit output signals (each in four bit binary format) to be generated to the comparators 23.

Each of the three decimal digit signals generated by the switch assemblies 25 is compared with a corresponding one of the three decimal digit signals generated by the BCD counter 22. The comparators 23 are tied together in a conventional fashion by first and second output lines 26 and 27 such that a high signal is generated on a third output line 28 whenever the three decimal digit output signals from the BCD counter 22 all equal the corresponding three decimal digit output signals from the switch assemblies 25. Assuming that the output pulses from the clock 21 are generated at a frequency of sixty cycles per second, as described above, the high output signal on the third output line 28 will be generated after a period of time (in seconds) which is equal to the decimal number set by the switch assemblies 25 divided by sixty.

The third output line 28 is connected to the input of a first monostable multivibrator circuit 29. The first monostable multivibrator circuit 29 is conventional in the art and is adapted to generate a high output pulse having a predetermined time duration when a high pulse is supplied to the input thereof. The output of the first monostable multivibrator circuit 29 is connected to a first input of a logic OR gate 30. As is well known, the OR gate 30 generates a high output signal when a high signal is received at any of its inputs. The output of the OR gate 30 is connected to a reset input of the BCD counter 22. Thus, when a high signal is generated on the third output line 28, the first monostable multivibrator circuit 29 generates a high output pulse to the OR gate 30. As a result, the count stored in the BCD counter 22 is automatically reset to zero. The time duration of the high output pulse of the first monostable multivibrator circuit 29 is selected to be less than the time duration of the clock pulses generated by the clock 21. Thus, once the BCD counter 22 is reset to zero, the reset signal is removed before the beginning of the next clock pulse. In this manner, each output pulse generated by the clock 21 is counted by the BCD counter 22.

A second input of the OR gate 30 is connected through an external single pole, single throw switch 31 to a source of positive voltage. The switch 31 is responsive to the operation of the winder 19 of the glass fiber forming machine 10 for moving between its opened and closed positions. When the winder 19 is operating normally so as to wind the strand 17a of glass fibers 17 about the tube 18, the switch 31 is opened. When the winder 19 is stopped, such as when the tube 18 is completely wound or when a premature stoppage occurs because of breakage of the strand 17a or other reason, the switch 31 is closed. In the latter instance, the source of positive voltage is connected to the second input of the OR gate 30. Consequently, the OR gate 30 generates a high output signal to the reset input of the BCD counter 22, as described above.

The third output line 28 from the comparators 23 is also connected to a first input of a first logic NAND gate 32. As is well known, the first NAND gate 32 generates a low output signal only when high signals are supplied to all of the inputs thereto. The output of the first NAND gate 32 is connected to a clock input of a binary up counter 33. The binary counter 33 is also conventional in the art and is responsive to the incoming pulses from the first NAND gate 32 for generating high output signals on a plurality of output lines 33a. In the illustrated embodiment, the binary counter 33 is provided with eight such output lines 33a. The high signals on the output lines 33a represent an eight bit binary number which is equal to the number of pulses received at the clock input of the binary counter 33.

The leading four output lines 33a from the binary counter 33 are connected to four inputs of a second logic NAND gate 35. Similar to the first NAND gate 32 described above, the second NAND gate 35 generates a low output signal only when high signals are supplied to all of the inputs thereto. Such a condition would occur only when the output signals from the binary counter 33 represent the binary number "11110000" or greater. The binary number "11110000" is equal to the decimal number "240". Thus, only when the count stored in the binary counter 33 reaches "11110000" will the second NAND gate 35 generate a low output signal on an output line 36. When the count stored in the binary counter 33 is less than "11110000", the output signal from the second NAND gate 35 will be high.

The output line 36 from the second NAND gate 35 is connected to a second input of the first NAND gate 32. So long as the count stored in the binary counter 33 is less than the binary number "11110000", the output signal from the first NAND gate 32 wll be the opposite of the signal supplied to the first input thereof. In other words, the output signal from the first NAND gate 32 will be high when the output signal from the comparators 23 is low, and vice versa. Therefore, the binary counter 33 is incremented on the trailing edges of the high output pulses from the comparators 23. When the count stored in the binary counter 33 reaches "11110000", the output signal from the second NAND gate 35 will go low. Consequently, the output signal from the first NAND gate 32 will be held high, regardless of the number of pulses received from the comparators 23. Thus, it can be seen that the binary counter 33 is disabled from being incremented further once two hundred forty output pulses have been generated by the comparators 23. Thereafter, the count stored in the binary counter 33 will remain at "11110000" until it is reset to zero, as described below.

The external switch 31 is also connected through an inverter 37 to the input of a second monostable multivibrator circuit 38. The structure and operation of the second monostable multivibrator circuit 38 is similar to the first monostable multivibrator circuit 29. The output of the second monostable multivibrator circuit 38 is connected to a reset input of the binary counter 33. When the switch 31 is moved from its closed position to its opened position, the second monostable multivibrator circuit 38 will generate a high output pulse to the reset input of the binary counter 33. As a result, the count stored in the binary counter 33 will be immediately reset to zero. The time duration of the high output pulse from the second monostable multivibrator circuit 38 is selected to shorter than the output pulses generated by the comparators 23. Thus, none of the pulses from the comparators 23 will be missed when the binary counter 33 is reset to zero.

The operation of the system thus far described will now be explained. Initially, the counts stored in both the BCD counter 22 and the binary counter 33 are zero. During the time when a bare tube 18 to be wound with a strand 17a of glass fibers 17 is inserted upon the winder 19, the winder 19 is not turned on. Therefore, the switch 31 is closed, causing a high signal to be applied through the OR gate 30 to the reset input of the BCD counter 22. Consequently, the output of the BCD counter 22 is held at zero, even though the clock 21 is constantly generating output pulses at a frequency of sixty cycles per second thereto.

Before starting the winder 19, an operator sets the switch assemblies 25 such that a three decimal digit signal is generated to the comparators 23. The three decimal digit signal is related to the known time required to completely wind the bare tube 18 with a strand 17a of the glass fibers 17. For reasons which will be explained below, the three decimal digit number set by the switch assemblies 25 should equal one quarter of the number of seconds required to completely wind the tube 18. Accordingly, assuming that it is known that the particular tube 18 requires twelve minutes to be completely wound, the switch assemblies 25 should be set to the decimal number "180", which is equal to the number of seconds in twelve minutes (seven hundred twenty seconds) divided by four.

When the winder 19 is started, the switch 31 is opened, thereby removing the high signal from the reset input of the BCD counter 22. The second monostable multivibrator 38 causes the binary counter 33 to be cleared to zero. Thereafter, the BCD counter 22 is incremented with each output pulse it receives from the clock 21. When the count stored in the BCD counter 22 reaches the three decimal digit number set by the switch assemblies 25, an output signal is generated on the third output line 28. As mentioned above, the output pulses on the third output line 28 will be generated at a rate (per second) which is equal to the decimal number set by the switch assemblies 25 divided by sixty. Each time an output pulse is generated on the third output line 28, the first monostable multivibrator 29 generates a high signal to the reset input of the BCD counter 22. Therefore, the BCD counter 22 repeatedly counts up to the decimal number set by the switch assemblies 25 and then is reset to zero. For example, if the switch assemblies 25 are set to the decimal number "180", then a signal will be generated repeatedly on the third output line 28 every three seconds.

The signals on the third output line 28 are fed through the first NAND gate 32 to the clock input of the binary counter 33. Since the count stored in the binary counter 33 is initially zero, the output signal from the second NAND gate 35 is high. Therefore, the output signal from the first NAND gate 32 is the inverse of the output signals on the third output line 28. As a result, the binary counter 33 counts upwardly from zero at a rate which is equal to the rate at which the output signals are generated by the comparators 23. So long as the strand 17a of the glass fibers 17 is continued to be wound upon the tube 18, the binary counter 33 will be incremented two hundred forty times, or until the count stored therein equals "11110000". If, for example, pulses are generated on the third output line 28 every three seconds as described above, the count stored in the binary counter 33 will reach "11110000" after seven hundred twenty seconds (which is two hundred forty times three seconds), or twelve minutes. This time period is equal to the time required to completely wind the tube.

It will be recalled that the switch assemblies 25 were set to the decimal number "180" for the twelve minute example discussed above. That number was described as being one quarter of the time (in seconds) required to completely wind the tube. The magnitude of that particular fraction was determined by the combination of the sixty cycles per second time division (performed by the BCD counter 22) and the two hundred forty counts per complete winding time multiplication (performed by the binary counter 33). Obviously, therefore, the particular fraction can be varied by changing either the frequency of the output pulses generated by the clock 21 or the number of counts stored in the binary counter 33 which will cause the second NAND gate 35 to generate a high output pulse.

When the binary counter 33 reaches the count of two hundred forty, the second NAND gate 35 generates a low output signal. As a result, the first NAND gate 32 prevents further output pulses from the comparator 23 from incrementing the binary counter 33 further. Therefore, the count stored in the binary counter 33 is held at "11110000" until the winder 19 is stopped by the operator of the system. At that time, the external switch 31 is closed. As mentioned above, the closing of the switch 31 causes the count stored in the BCD counter 22 to be reset to zero. Despite that, the count stored in the binary counter 33 is held at "11110000" and remains at that count until the wound tube 18 on the winder 19 is replaced by a bare tube 18. At that time, the winder 19 is re-started, causing the switch 31 to be moved to its opened position. When the switch 31 is re-opened, a high signal is supplied from the second monostable multivibrator 38 to the reset input of the binary counter 33. Thus, the count stored in the binary counter 33 is maintained until the winder 19 is re-started, at which time it is reset to zero. The above described process may then be repeated for the new tube to be wound.

As mentioned above, the switch 31 is closed when the winder 19 of the glass fiber forming machine 10 is stopped for any reason. Such stoppage may occur prior to the completion of the winding process. If that situation occurs, the count stored in the BCD counter 22 is immediately cleared to zero and held at that number, as described above. Consequently, no further output pulses are generated from the comparators 23 to the binary counter 33. As a result, the count stored in the binary counter 33 is held at whatever number it had counted up to prior to the stoppage. That number will be maintained in the binary counter 33 until the winder 19 is re-started. At that time, the binary counter 33 will be cleared to zero as described above.

Continuing on with the description of the system, all of the output lines 33a from the binary counter 33 are fed to a first digital to analog converter 40. The first converter 40 is conventional in the art and is adapted to generate an analog electrical output signal (generally an electrical current) which is proportional in magnitude to the value of the binary number presented on the output lines 33a. A reference voltage source 41 is connected to the first converter 40. The source 41 provides a maximum reference level for the converter 40. Thus, the output signal from the converter 40 is precisely defined in accordance with the input signals and the reference signal.

The output signal from the converter 40 is combined with the output signal from the first thermocouple 15, as schematically illustrated at a summing junction 42. As explained above, the temperature of the bushing 11 is a carefully controlled parameter in the glass fiber formation process. To insure that the temperature of the bushing 11 is such that glass fibers are being properly formed, the first thermocouple 15 is attached to the bushing 11. The first thermocouple 15 is a conventional device in the art for generating an electrical output signal which is representative of the actual temperature of the bushing 11. The electrical output signal generated by the thermocouple 15 is fed to the summing junction 42, where it is combined with the output sigal from the converter 40 to form a composite feedback signal.

The output signal from the converter 40 is typically an electrical current, the value of which ranges at a linear rate between zero (when the count stored in the binary counter 33 equals zero) and a predetermined negative level (when the count stored in the binary counter 33 equals "11110000") determined by the value of the reference voltage, as described above. Thus, when the tube 18 is initially being wound, the count stored in the binary counter 33 is relatively small, and the converter 40 does not greatly modify the output signal passing from the first thermocouple 15 to the temperature comparator 14. However, as the tube 18 is continued to be wound, the count stored in the binary counter 33 increases. Coincident with such increase, the converter 40 causes the magnitude of the signal passing from the first thermocouple 15 to the temperature comparator 14 to be decreased. Consequently, it appears to the temperature comparator 14 that the actual temperature of the bushing 11 continues to decrease below the desired temperature as the tube 18 is wound. Thus, the temperature comparator 14 causes the power supply 12 to increase the the amount of current passing through the bushing 11. In this manner, the temperature of the bushing 11 is increased as the tube 18 is wound.

When the tube 18 is completely wound, or when the winding process is prematurely interrupted, the count stored in the binary counter 33 is held at the current number until the the winder 19 is re-started. Thus, during the time while the winder 19 is not operated, the temperature of the bushing 11 will be held at the current level. When the winder 19 is re-started, the count stored in the binary counter 33 is reset to zero, causing the temperature comparator 14 to instruct the power supply 12 to reduce the reduce the amount of electric current passed through the bushing 11 and, therefore, the temperature of the bushing 11. It will be appreciated that the temperature of the bushing 11 will generally be relatively high at the beginning of each re-started winding process, since the count stored in the binary counter 33 is not reset to zero until the winder 19 is re-started. Such initial high temperature is desirable because the temperature of the molten glass tends to decrease somewhat during an interruption of the glass fiber formation process. The elevated temperature of the bushing 11 during such interruptions insures that the flow of the molten glass through the bushing 11 will be smooth during the beginning of the winding process. The temperature of the bushing 11 decreases quickly once the count stored in the binary counter 33 is reset to zero, relative to the overall length of time required to completely wind the tube 18. Thus, the diameter of the glass fibers 17 will not be significantly affected in an appreciable manner.

As shown in FIG. 1, the bushing 11 may be composed of a plurality of individual sections. The first thermocouple 15 is illustrated as being attached to the center section of the bushing 11. It may be desirable to attach an additional thermocouple to each of the other individual sections of the bushing 11. Accordingly, as shown in FIG. 2, second and third thermocouples 43 and 45 may be provided. The output lines 33a from the binary counter 33 are connected through respective optical isolation circuits 46 and 47 to second and third digital to analog converter 48 and 50. The optical isolation circuits 46 and 47 are conventional in the art and are provided to prevent the flow of current flow through one of the individual sections of the bushing 11 from affecting the current flow through other individual sections thereof. The operation of the second and third converters 48 and 50 is otherwise identical to the first converter 40 described above.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

INDUSTRIAL APPLICABILITY

In the production of glass fibers, it is desirable to produce a plurality of fibers of uniform diameter, which result in uniform package size. The digitally controlled tube build-up compensator of the present invention facilitates control of a glass fiber forming machine having constant speed winders to produce uniform fiber diameters by increasing the temperature of a glass fiber forming bushing at a constant linear rate as the fibers are wound upon tubes rotated by the winders.

I claim:

1. A method for forming a plurality of glass fibers having a substantially uniform diameter comprising:
   (a) passing molten glass through a plurality of apertures formed in a bushing to form the plurality of glass fibers;
   (b) generating a signal representative of the actual temperature of the bushing;
   (c) generating a digitally controlled temperature compensating signal which changes as a function of time;
   (d) generating a composite feedback signal indicating that the actual temperature of said bushing is decreasing over a period of time in response to the actual temperature signal and the temperature compensating signal; and
   (e) increasing the temperature of said bushing over said period of time in response to the composite feedback signal.

2. The invention defined in claim 1 wherein step of generating a digitally controlled temperature compensating signal includes the steps of generating clock pulses at a predetermined frequency to a counter means, generating a plurality of output signals from the counter means which is representative of the number of such clock pulses which have been received thereby, generating an analog output signal from a converter means having a magnitude which is proportional to the number represented by such counter means output signals, and controlling the temperature of the bushing in response to the magnitude of the converter output signal.

3. The invention defined in claim 2 further including the step of resetting the counter means to zero after a predetermined number of clock pulses have been received thereby.

4. The invention defined in claim 2 further including the steps of generating a plurality of output signals from a binary coded decimal counter representative of the number of clock pulses received thereby and generating an output signal from a comparator means when the output signals from the binary coded decimal counter is representative of a predetermined number.

5. The invention defined in claim 4 further including the step of resetting the binary coded decimal counter to zero when the output signals from the binary coded decimal counter is representative of the predetermined number.

6. The invention defined in claim 4 further including the steps of generating a plurality of output signals from a binary counter representative of the number of the comparator means output signals received thereby and generating the converter output signal in proportion to the number represented by such second counter output signals, 7. The invention defined in claim 6 further including the steps of rotating a tube at a constant speed so as to wind a strand of the glass fibers about the tube and preventing the second counter from receiving the comparator means output signals when the winder means is not rotating said tube.

8. The invention defined in claim 7 further including the step of resetting the number represented by the second counter output signals to zero after the winder means is started to rotate the tube after not rotating the tube.

9. The invention defined in claim 6 further including the step of disabling the second counter from receiving the comparator means output signals when the second counter receives a predetermined number of such signals.

10. The invention defined in claim 1 wherein said temperature compensating signal changes linearly as a function of time.

11. The invention defined in claim 1 wherein said temperature compensating signal increases as a function of time.

12. The invention defined in claim 11 wherein said temperature compensating signal is subtracted from said actual temperature signal so as to generate said composite feedback signal.

* * * * *